(12) United States Patent
Nakamura (10) Patent No.: US 10,717,153 B2
(45) Date of Patent: Jul. 21, 2020

(54) LASER WELDING METHOD FOR FLAT WIRES

(71) Applicant: TOYOTA JIDOSHA KABUSHIKI KAISHA, Toyota-shi, Aichi-ken (JP)

(72) Inventor: Hideo Nakamura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 380 days.

(21) Appl. No.: 15/660,103

(22) Filed: Jul. 26, 2017

(65) Prior Publication Data

US 2018/0036836 A1   Feb. 8, 2018

(30) Foreign Application Priority Data

Aug. 2, 2016   (JP) ................................. 2016-152242

(51) Int. Cl.

| B23K 26/06 | (2014.01) |
| H02K 3/28 | (2006.01) |
| B23K 26/073 | (2006.01) |
| B23K 26/22 | (2006.01) |
| H01R 4/02 | (2006.01) |
| H02K 15/00 | (2006.01) |
| H02K 15/085 | (2006.01) |

(Continued)

(52) U.S. Cl.
CPC ...... *B23K 26/0604* (2013.01); *B23K 26/0736* (2013.01); *B23K 26/22* (2013.01); *H01R 4/021* (2013.01); *H01R 4/029* (2013.01); *H02K 3/28* (2013.01); *H02K 15/0081* (2013.01); *H02K 15/085* (2013.01); *B23K 2101/32* (2018.08); *B23K 2101/38* (2018.08); *H01R 4/026* (2013.01)

(58) Field of Classification Search
CPC ............ B23K 26/0604; B23K 26/0736; B23K 26/22; H02K 3/28; H02K 15/0081; H02K 15/085; H02K 3/12; H02K 3/505; H02K 15/0068
See application file for complete search history.

(56) References Cited

U.S. PATENT DOCUMENTS

| 4,691,093 A | 9/1987 | Banas et al. | |
| 6,403,921 B1 * | 6/2002 | Maeda | H02K 3/12 |
| | | | 219/125.11 |

(Continued)

FOREIGN PATENT DOCUMENTS

| EP | 2263823 A1 | 12/2010 |
| JP | 2002-137073 A | 5/2002 |

(Continued)

*Primary Examiner* — Brian W Jennison
(74) *Attorney, Agent, or Firm* — Hunton Andrews Kurth LLP (57) ABSTRACT

Provided is a laser welding method for flat wires in which side surfaces at ends of first and second flat wires coated with insulating films, the side surfaces being stripped of the insulating films, are butted together, and a laser beam is applied to end surfaces of the first and second flat wires to weld together the side surfaces. This method includes: applying the laser beam in a loop shape inside the end surface of the first flat wire to form a molten pool; and gradually increasing the diameter of a loop-shaped application trajectory of the laser beam inside the end surface of the first flat wire to allow the molten pool to reach the side surfaces.

11 Claims, 10 Drawing Sheets

(51) Int. Cl.
*B23K 101/32* (2006.01)
*B23K 101/38* (2006.01)

(56) References Cited

U.S. PATENT DOCUMENTS

| | | | |
|---|---|---|---|
| 6,990,724 B2* | 1/2006 | Tamura | H02K 15/0056 |
| | | | 206/722 |
| 7,788,791 B2* | 9/2010 | Hara | H02K 15/0081 |
| | | | 29/596 |
| 2003/0024101 A1* | 2/2003 | Tokizawa | H02K 3/12 |
| | | | 29/596 |
| 2016/0354867 A1* | 12/2016 | Matsuoka | B23K 26/0626 |
| 2017/0310198 A1 | 10/2017 | Frohlich et al. | |

FOREIGN PATENT DOCUMENTS

| | | |
|---|---|---|
| JP | 2005-095942 A | 4/2005 |
| JP | 2006-304507 A | 11/2006 |
| JP | 2013-109948 A | 6/2013 |
| WO | 2015129248 A1 | 9/2015 |
| WO | 2016096183 A1 | 6/2016 |

* cited by examiner

RELATED ART

LASER WELDING METHOD FOR FLAT WIRES

INCORPORATION BY REFERENCE

The disclosure of Japanese Patent Application No. 2016-152242 filed on Aug. 2, 2016 including the specification, drawings and abstract is incorporated herein by reference in its entirety.

BACKGROUND

1. Technical Field

The present disclosure relates to a laser welding method for flat wires.

2. Description of Related Art

A stator of a motor includes a stator core and a plurality of segment coils that are mounted in slots of the stator core. Each segment coil is typically a flat wire coated with an insulating film. Ends of the segment coils are joined to one another by welding etc.

Japanese Patent Application Publication No. 2013-109948 discloses a laser welding method for flat wires that are used for segment coils, for example. In JP 2013-109948 A, a pair of flat wires coated with insulating films are stripped of the insulating films from side surfaces at their ends, and then these side surfaces at the ends are butted together and a laser beam is applied to end surfaces of the flat wires to weld together the side surfaces at the ends.

SUMMARY

Figure 16:
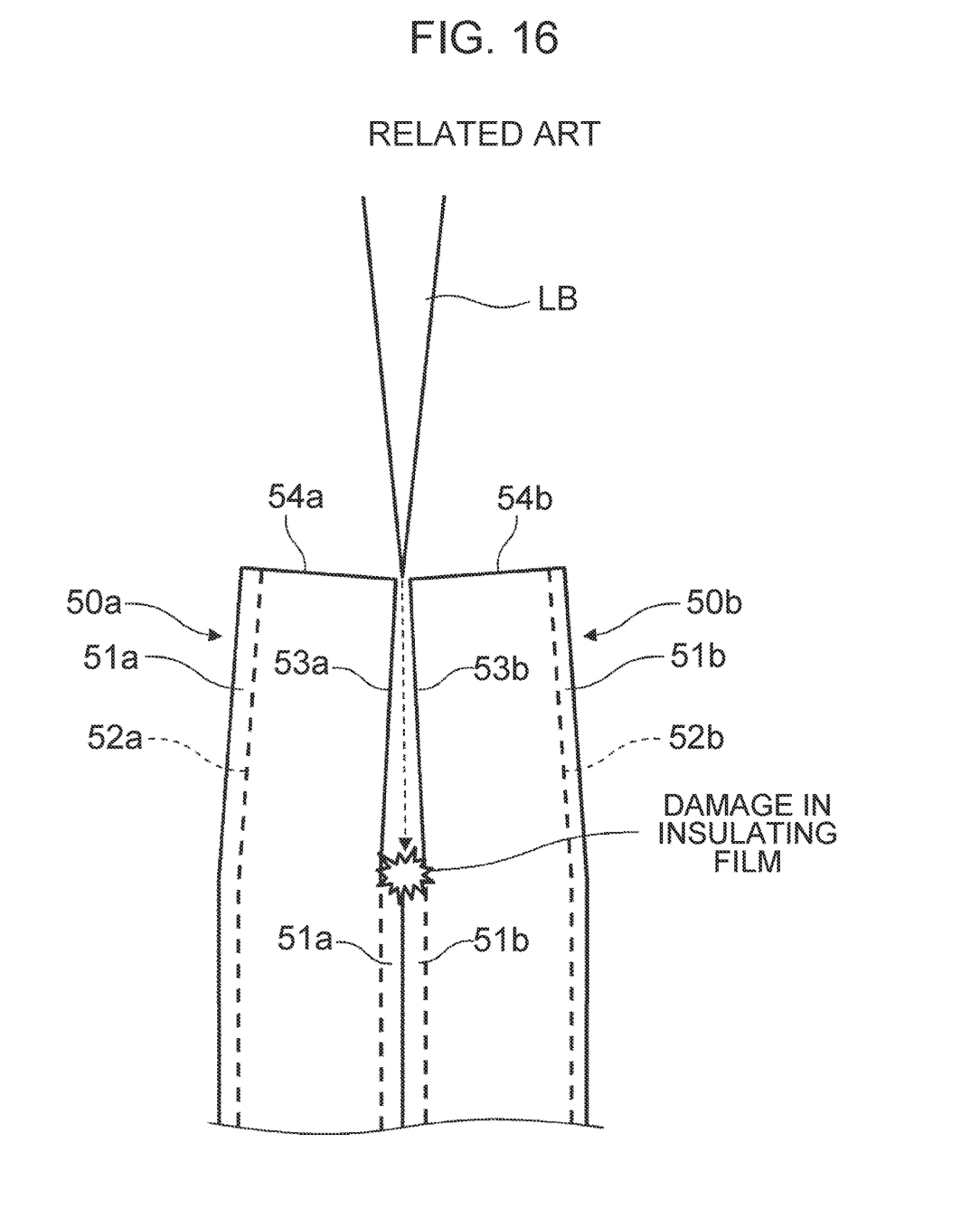
FIG. 16 is a side view of a joint part illustrating the problem with the laser welding method disclosed in JP 2013-109948 A.

The present inventors have found the following problem with the laser welding method for flat wires disclosed in JP 2013-109948 A. FIG. 16 is a side view of a joint part illustrating the problem with the laser welding method disclosed in JP 2013-109948 A. As shown in FIG. 16, a side surface 53*a* of a flat wire 50*a* has a step between a part where an insulating film 51*a* is stripped off and the other part where the insulating film 51*a* is not stripped off. Similarly, a side surface 53*b* of a flat wire 50*b* has a step between a part where an insulating film 51*b* is stripped off and the other part where the insulating film 51*b* is not stripped off. Moreover, although this is not shown, end surfaces 54*a*, 54*b* undergo a cutting process, so that some burrs and sags occur in the end surfaces 54*a*, 54*b*. For these reasons, a clearance is left between the side surfaces 53*a*, 53*b* even when the flat wires 50*a*, 50*b* are clamped at the joint part. In FIG. 16, the broken lines indicated inside the flat wires 50*a*, 50*b* represent conductor sections 52*a*, 52*b*.

According to the laser welding method disclosed in JP 2013-109948 A, a laser beam LB is applied to the side surfaces 53*a*, 53*b*. Thus, as shown in FIG. 16, the laser beam LB may enter the clearance therebetween and damage the insulating films 51*a*, 51*b* of the flat wires 50*a*, 50*b*. Moreover, the laser beam LB may pass through this clearance and damage insulating films of other flat wires, for example.

The present disclosure provides a laser welding method for flat wires by which adverse effects caused by a laser beam entering a clearance between side surfaces to be joined together can be reduced.

One aspect of the present disclosure is a laser welding method for flat wires in which a first side surface at a first end of a first flat wire coated with a first insulating film, the first side surface being stripped of the first insulating film, and a second side surface at a second end of a second flat wire coated with a second insulating film, the second side surface being stripped of the second insulating film, are butted together, and a laser beam is applied to a first end surface of the first flat wire and a second end surface of the second flat wire to weld together the first side surface and the second side surface, the laser welding method including: applying the laser beam in a loop shape inside the first end surface to form a molten pool; and applying the laser beam inside the first end surface while gradually increasing the diameter of a loop-shaped trajectory of the laser beam to allow the molten pool to reach the first side surface and the second side surface.

In this aspect of the present disclosure, the laser beam is applied in a loop shape inside the end surface of the first flat wire to form a molten pool, and the diameter of the loop-shaped trajectory of the laser beam is gradually increased to allow the molten pool to reach the first side surface and the second side surface. According to this configuration, it is possible to fill the clearance between the first side surface and the second side surface with the molten pool without the laser beam being applied between the first side surface and the second side surface, and thus to prevent the laser beam from entering this clearance. As a result, adverse effects caused by the laser beam entering the clearance between the side surfaces can be reduced.

The loop shape may be a circular shape or an elliptical shape. According to this configuration, the laser beam can be applied along a smooth trajectory, which is less likely to cause a disturbance in the molten pool, so that spatter can be suppressed.

The loop shape may be a rectangular shape.

The loop shape may be a spiral shape.

The loop shape may be an elliptical shape, and a major axis of the ellipse may be parallel to the first side surface and the second side surface. Being "parallel" here is a concept including not only being exactly parallel but also being "substantially parallel" that means being parallel as judged by technical common sense. According to this configuration, the molten pool is allowed to reach a wide area of the clearance between the first side surface and the second side surface in a short time.

In the first end surface, the laser beam may be applied to only a region of the first end surface that is located on the side of the first side surface relative to an application start position of the laser beam.

The laser beam may be applied to the second end surface as the diameter of the loop-shaped trajectory of the laser beam increases gradually.

In the above aspect, the laser welding method may further include: applying another laser beam in a loop shape inside the second end surface to form another molten pool; and applying the other laser beam inside the second end surface while gradually increasing the diameter of a loop-shaped trajectory of the other laser beam to fuse together the molten pool and the other molten pool. According to this configuration, it is possible to fill the clearance between the first side surface and the second side surface with two molten pools without the laser beam being applied between the first side surface and the second side surface, and thus to further prevent the laser beam from entering this clearance. As a result, adverse effects caused by the laser beam entering the clearance between the first side surface and the second side surface can be further reduced.

In the above aspect, in the first end surface, the laser beam may be applied to only a region of the first end surface that is located on the side of the first side surface relative to an application start position of the laser beam, and in the second end surface, the other laser beam may be applied to only a region of the second end surface that is located on the side of the second side surface relative to an application start position of the other laser beam.

In the above aspect, the laser beam may be applied to the second end surface as the diameter of the loop-shaped trajectory of the laser beam increases gradually, and the other laser beam may be applied to the first end surface as the diameter of the loop-shaped trajectory of the other laser beam increases gradually.

In the above aspect, the laser beam may be applied to only the first end surface, and the other laser beam may be applied to only the second end surface.

The present disclosure can provide a laser welding method for flat wires by which adverse effects caused by a laser beam entering the clearance between the first side surface and the second side surface can be reduced.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

In the following, specific embodiments as applications of the present disclosure will be described in detail with reference to the drawings. However, the present disclosure is not limited to the following embodiments. To clarify the illustration, the following description and the drawings are appropriately simplified.

First Embodiment

Figure 1:
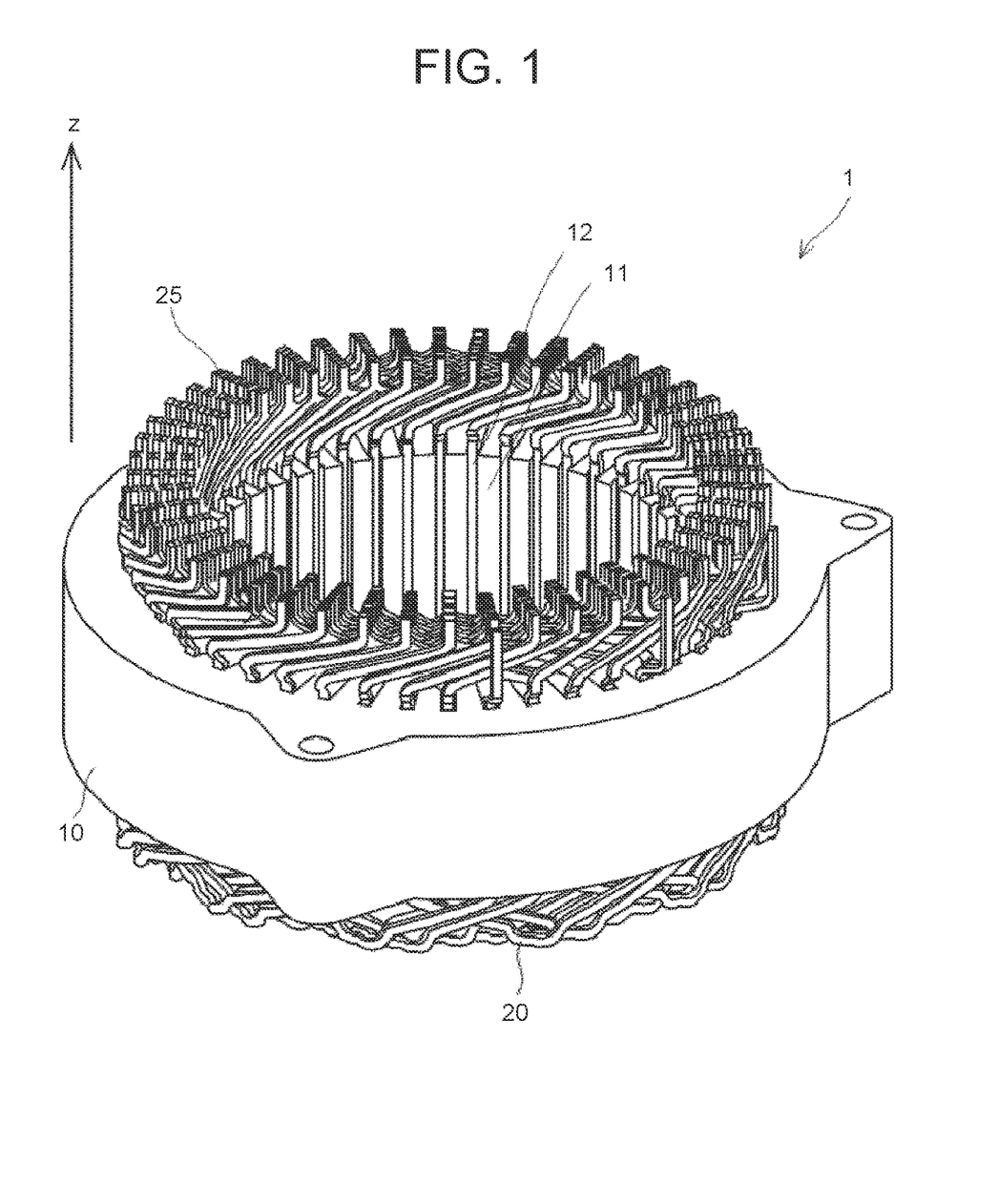
FIG. 1 is a perspective view showing a schematic configuration of a stator.

First, an example of the configuration of a stator including segment coils that are welded by a laser welding method for flat wires according to this embodiment will be described. FIG. 1 is a perspective view showing the schematic configuration of the stator. As shown in FIG. 1, a stator 1, which is a stator of a motor, includes a stator core 10 and a plurality of segment coils 20.

The stator core 10 is formed by stacking annular magnetic steel sheets in an axial direction of the stator 1 (a z-axis direction in FIG. 1), and has a substantially cylindrical shape as a whole. An inner circumferential surface of the stator core 10 is provided with teeth 11 that protrude toward an inner circumferential side and extend in the axial direction of the stator 1, and slots 12 that are grooves formed between the adjacent teeth 11. The segment coils 20 are respectively mounted in the slots 12.

The segment coil 20 is an electric wire with a rectangular cross-sectional shape, i.e., a flat wire. The segment coil 20 is typically made of pure copper, but may instead be made of a metal material having high electric conductivity, such as aluminum or an alloy composed mainly of copper and aluminum.

Each segment coil 20 is formed substantially in a U-shape. As shown in FIG. 1, ends of the segment coils 20 (coil ends) each protrude from an upper end surface of the stator core 10. A joint part 25 is a part where the ends of the segment coils 20 adjacent to each other in a radial direction are welded together. A plurality of joint parts 25 are arrayed annularly in a circumferential direction of the stator core 10. In the example of FIG. 1, 48 joint parts 25 are arrayed annularly. Four rows of the joint parts 25 thus arrayed annularly are disposed in the radial direction.

Figure 2:
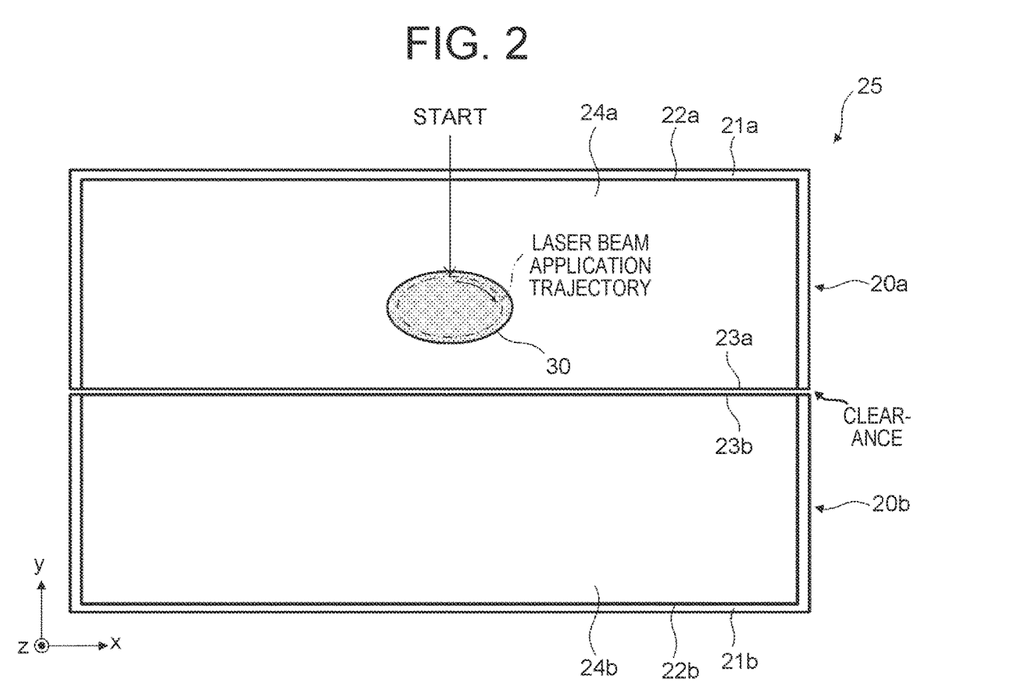
FIG. 2 is a plan view showing a laser welding method for flat wires according to a first embodiment.
Figure 3:
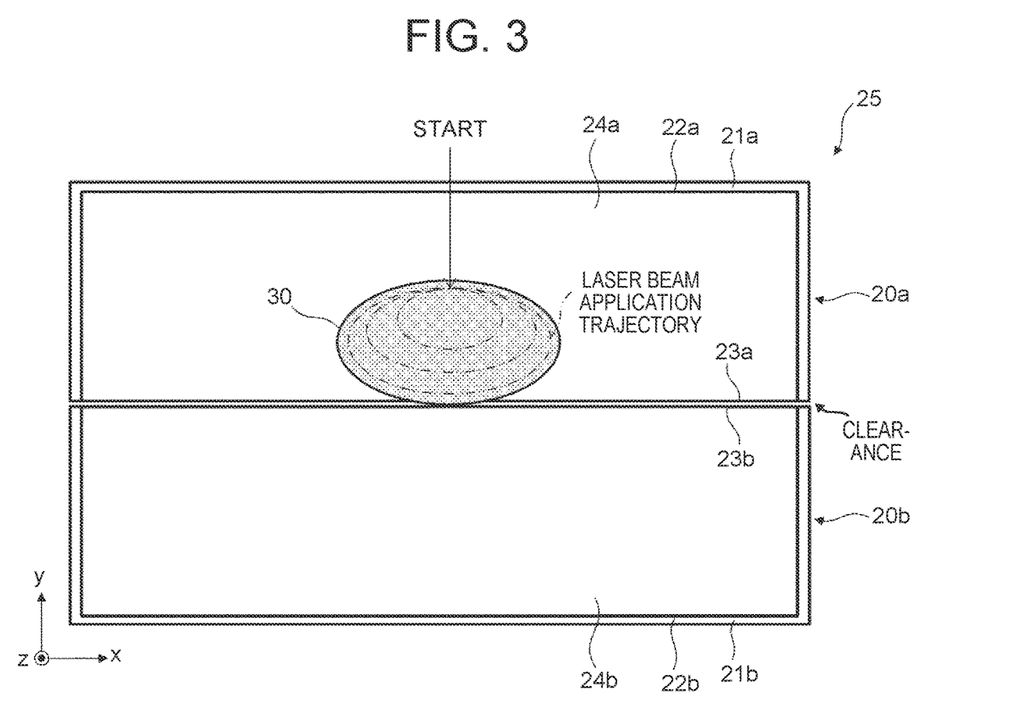
FIG. 3 is a plan view showing the laser welding method for flat wires according to the first embodiment.
Figure 4:
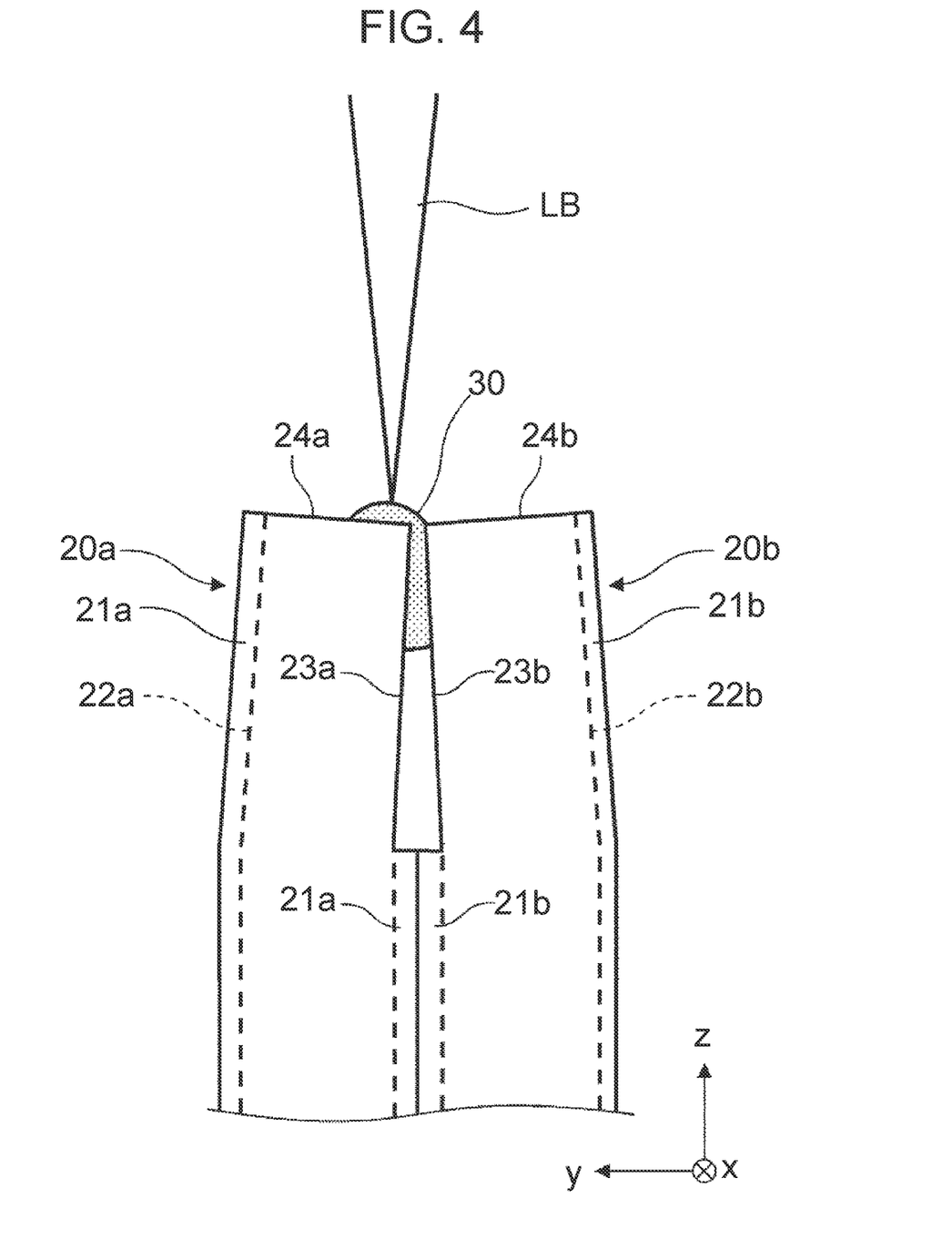
FIG. 4 is a side view of FIG. 3.
Figure 5:
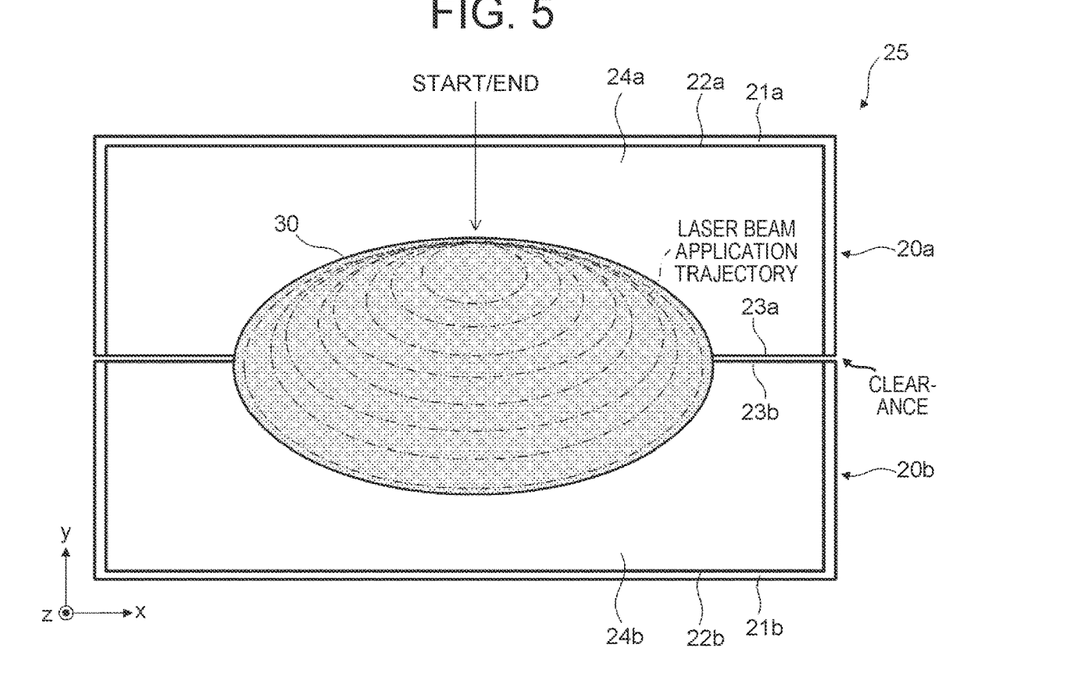
FIG. 5 is a plan view showing the laser welding method for flat wires according to the first embodiment.

Next, the laser welding method for flat wires according to this embodiment will be described with reference to FIG. 2 to FIG. 5. FIG. 2, FIG. 3, and FIG. 5 are plan views showing the laser welding method for flat wires according to the first embodiment. FIG. 4 is a side view of FIG. 3. The laser welding method for flat wires according to this embodiment is used to laser-weld the joint parts 25 of the segment coils 20 shown in FIG. 1. It should be understood that the right-handed xyz-coordinates shown in FIG. 2 to FIG. 5 are for the convenience of describing positional relations among components. The z-axis direction in FIG. 1 and z-axis directions in FIG. 2 to FIG. 5 coincide with each other. Normally, a positive z-axis direction is a vertically upward direction, and an xy-plane is a horizontal plane.

First, as shown in FIG. 2, a first side surface 23a at a first end of a first flat wire (segment coil) 20a that is stripped of a first insulating film 21a and a second side surface 23b at a second end of a second flat wire (segment coil) 20b that is stripped of a second insulating film 21b are butted together at the joint part 25. Then, a laser beam is applied to a first end surface 24a of the first flat wire 20a in a vertically downward direction (a negative z-axis direction). This laser beam is applied in a loop shape inside the first end surface 24a of the first flat wire 20a to form a molten pool 30. The loop shape means an annular shape (closed loop) or a spiral shape (open loop). In the shown example, the laser beam application trajectory has an elliptical shape.

Here, if the laser beam application trajectory does not have a loop shape, the molten pool 30 formed cannot be grown. Being made of a metal material having high electric conductivity, first and second conductor sections 22a, 22b of the first and second flat wires 20a, 20b are also excellent in heat conductivity. Accordingly, portions melted by application of the laser beam quickly solidify. For the same reason, the molten pool 30 cannot be formed if the diameter of the loop-shaped application trajectory is too large. Therefore, the molten pool 30 is formed with a somewhat reduced diameter of the loop-shaped application trajectory.

As shown in FIG. 2, in the laser welding method for flat wires according to this embodiment, first the laser beam is applied in a loop shape inside the first end surface 24a of the first flat wire 20a to form the molten pool 30. Thus, no laser beam is applied to the first and second side surfaces 23a, 23b. At this stage, therefore, the laser beam is prevented from entering the clearance between the first side surface 23a and the second side surface 23b.

Next, as shown in FIG. 3, the diameter of the laser beam application trajectory, i.e., the diameter of the ellipse, is increased inside the first end surface 24a of the first flat wire 20a to allow the molten pool 30 to reach the first and second side surfaces 23a, 23b. Specifically, each time the laser beam returns to an application start position (START indicated by the arrow in FIG. 3), the diameter of the ellipse being the application trajectory is increased. Thus, the diameter of the molten pool 30 also increases stably, so that, at the stage where the laser beam is applied inside the first end surface 24a of the first flat wire 20a, the molten pool 30 reaches the first and second side surfaces 23a, 23b. Here, a major axis of the elliptical application trajectory is parallel to the first and second side surfaces 23a, 23b (to the long sides of the first and second flat wires 20a, 20b in the shown example). This can allow the molten pool 30 to reach a wide area of the clearance between the first side surface 23a and the second side surface 23b in a short time.

As a result, as shown in the side view of FIG. 4, the clearance between the first side surface 23a and the second side surface 23b is filled with the molten pool 30. That is, at this stage, as shown in FIG. 4, the laser beam LB is not applied to the first and second side surfaces 23a, 23b, and the clearance between the first side surface 23a and the second side surface 23b is filled with the molten pool 30. Thus, the laser beam LB is prevented from entering the clearance between the first side surface 23a and the second side surface 23b.

Next, as shown in FIG. 5, the diameter of the laser beam application trajectory, i.e., the diameter of the ellipse, is increased across the first end surface 24a of the first flat wire 20a and the second end surface 24b of the second flat wire 20b, until the molten pool 30 grows to a desired size. Specifically, each time the laser beam returns to the application start position (START indicated by the arrow in FIG. 5), the diameter of the ellipse being the application trajectory is increased. When the diameter of the ellipse reaches a predetermined value, application of the laser beam is ended at the application start position (END indicated by the arrow in FIG. 5).

At this stage, as shown in FIG. 5, the laser beam passes over the first and second side surfaces 23a, 23b, but the clearance between the first side surface 23a and the second side surface 23b has already been filled with the molten pool 30. Thus, the laser beam is prevented from entering the clearance between the first side surface 23a and the second side surface 23b.

As has been described above, in the laser welding method for flat wires according to this embodiment, first the laser beam is applied in a loop shape inside the first end surface 24a of the first flat wire 20a to form the molten pool 30. Thereafter, the diameter of the laser beam application trajectory, i.e., the diameter of the ellipse, is increased inside the first end surface 24a of the first flat wire 20a to allow the molten pool 30 to reach the first and second side surfaces 23a, 23b.

In other words, the clearance between the first side surface 23a and the second side surface 23b is filled with the molten pool 30 without the laser beam being applied to the first and second side surfaces 23a, 23b. Thus, the laser beam can be prevented from entering the clearance between the first side surface 23a and the second side surface 23b. As a result, adverse effects caused by the laser beam entering the clearance between the side surfaces can be reduced.

Thus, in the laser welding method for flat wires according to this embodiment, the molten pool 30 is formed inside the end surface of one flat wire, and the molten pool 30 is grown so as to reach the clearance between the first side surface 23a and the second side surface 23b. It was confirmed that this method could prevent a laser beam from entering a clearance of up to 0.15 mm.

In the laser welding method for flat wires according to this embodiment, the laser beam application trajectory has a loop shape, so that the laser beam can be applied along a smooth trajectory. Thus, heat is less likely to concentrate, and generation of spatter can be suppressed. For example, if the laser beam application trajectory follows a path with hairpin turns, heat concentrates at turnaround points and spatter tends to occur. In addition, growing the molten pool 30 can increase the diameter of the molten pool 30 relative to the depth of penetration of the molten pool 30. Thus, generation of spatter can be suppressed as the surface tension of the molten pool 30 is increased.

Figure 6:
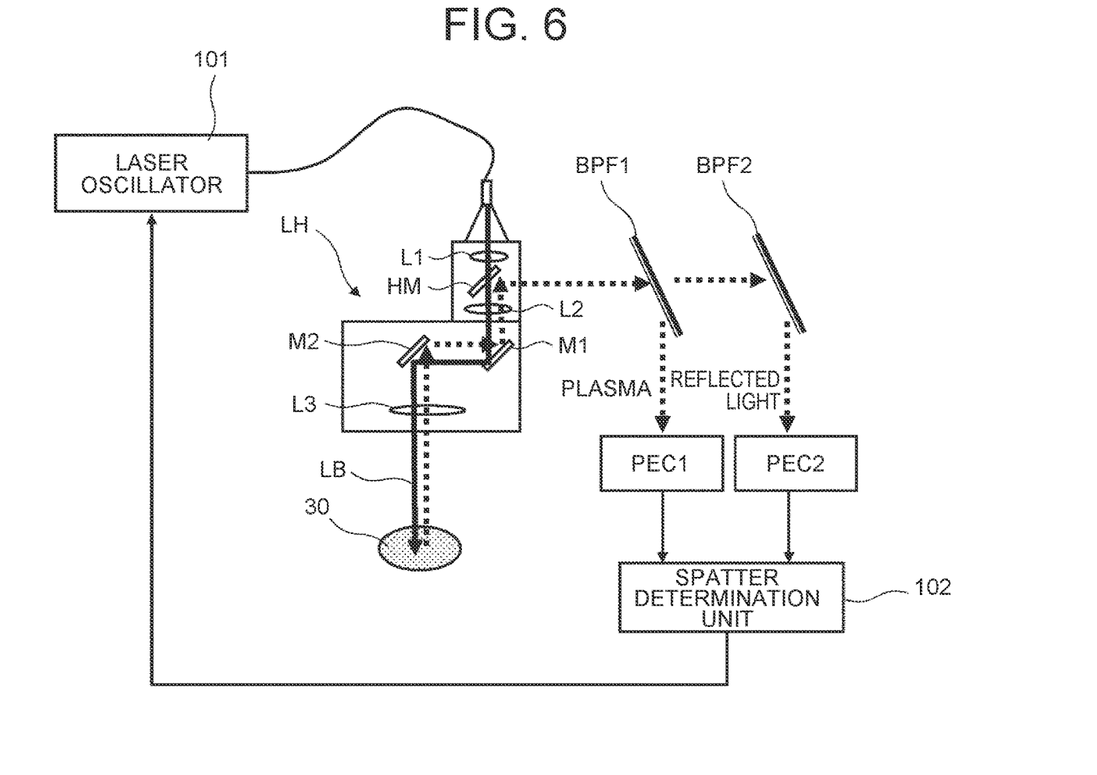
FIG. 6 is a block diagram showing a configuration of a laser welding apparatus used in the laser welding method for flat wires according to the first embodiment.

Next, a laser welding apparatus used in the laser welding method for flat wires according to this embodiment will be described with reference to FIG. 6. FIG. 6 is a block diagram showing the configuration of the laser welding apparatus used in the laser welding method for flat wires according to the first embodiment. As shown in FIG. 6, the laser welding apparatus used in the laser welding method for flat wires according to the first embodiment includes a laser oscillator 101, a laser head LH, bandpass filters BPF1, BPF2, photoelectric conversion circuits PEC1, PEC2, and a spatter determination unit 102.

The laser oscillator 101 is a highly-focusing laser oscillator that can oscillate a single-mode fiber laser beam with a beam diameter of 100 μm or smaller, for example. The laser head LH is a galvano-scanning laser head that can apply a laser beam at a rate of 500 mm/sec or higher, for example. The laser head LH includes lenses L1 to L3, a semi-transparent mirror HM, and mirrors M1, M2. The laser beam LB output from the laser oscillator 101 and input into the laser head LH passes through the lens L1, the semi-transparent mirror HM, the lens L2, the mirrors M1, M2, and the lens L3 in this order, and is applied to the molten pool 30.

Reflected light of the laser beam LB reflected off the molten pool 30 passes through the lens L3, the mirror M2, the mirror M1, the lens L2, and the semi-transparent mirror HM of the laser head LH in this order, and is selected by the bandpass filter BPF1. Then, the reflected light selected by the bandpass filter BPF1 is converted into an electric signal by the photoelectric conversion circuit PEC1 and input into the spatter determination unit 102.

Meanwhile, plasma (e.g., with a wavelength of 400 to 600 nm) generated in the molten pool 30 passes through the lens L3, the mirror M2, the mirror M1, the lens L2, and the semi-transparent mirror HM of the laser head LH in this order, and is selected by the bandpass filter BPF2. Then, the plasma selected by the bandpass filter BPF2 is converted into an electric signal by the photoelectric conversion circuit PEC2 and input into the spatter determination unit 102.

Figure 7:
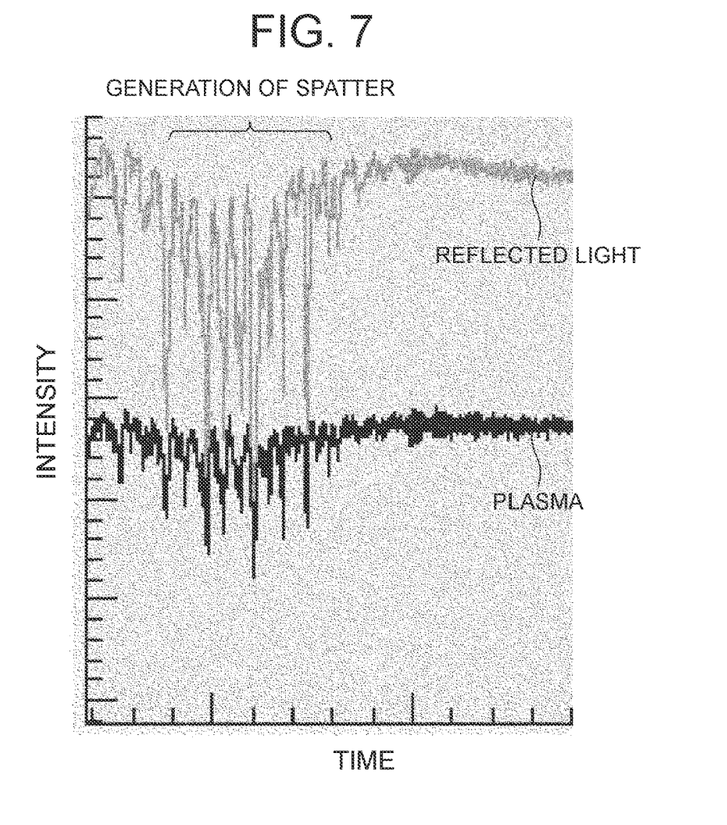
FIG. 7 is a graph showing fluctuations of plasma and reflected light.

The spatter determination unit 102 determines whether spatter is generated in the molten pool 30 on the basis of fluctuations observed of at least one of the plasma and the reflected light. FIG. 7 is a graph showing the fluctuations of the plasma and the reflected light. In FIG. 7, the horizontal axis and the vertical axis represent time and intensity, respectively. As shown in FIG. 7, generation of spatter can be detected from the fluctuations of the plasma and the reflected light. Thus, it is possible to detect spatter in real time during welding, rather than after welding. Moreover, for example, when the extent or the number of times of generation of spatter exceeds a predetermined reference value, the spatter determination unit 102 determines that a weld failure has occurred, and stops the laser oscillator 101. Then, a current product is switched to a next one. Determining a weld failure thus in real time during welding, rather than after welding, can improve the productivity more than is possible by the related art.

Modified Example of First Embodiment

Figure 8:
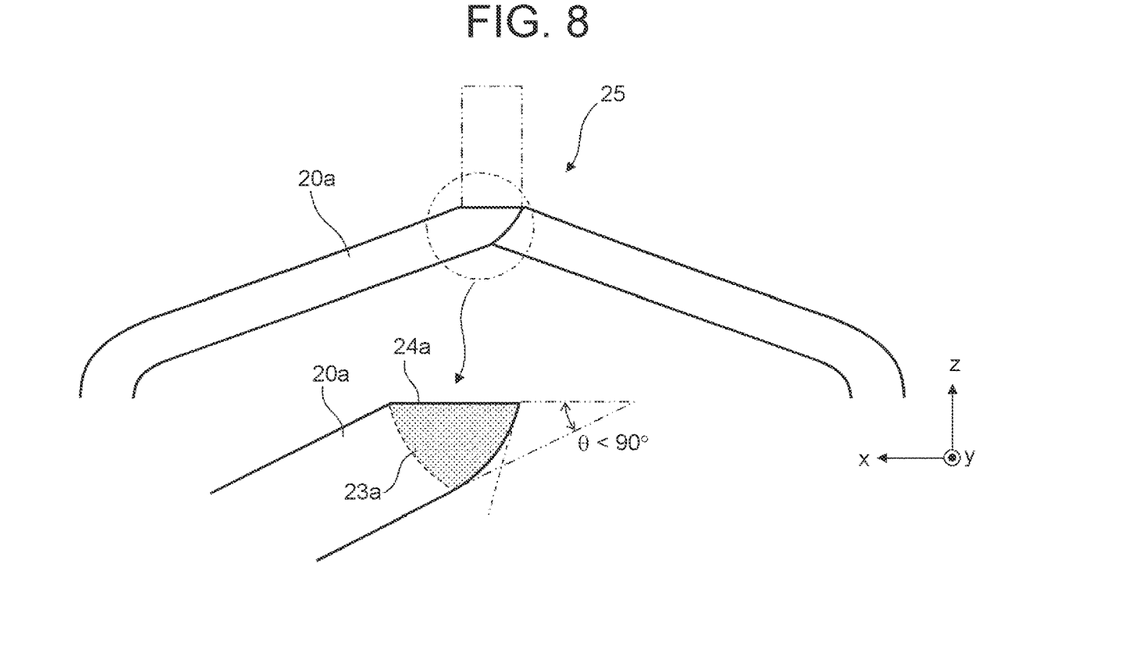
FIG. 8 is a side view showing a modified example of a joint part 25 of flat wires 20a, 20b in the laser welding method for flat wires according to the first embodiment.

A modified example of the first embodiment will be described with reference to FIG. 8. FIG. 8 is a side view showing a modified example of the joint part 25 of the first and second flat wires 20a, 20b in the laser welding method for flat wires according to the first embodiment. The right-handed xyz-coordinates shown in FIG. 8 coincide with those in FIG. 2 to FIG. 5.

In the example shown in FIG. 1, the joint part 25 stands vertically (in the z-axis direction) as indicated by the two-dot dashed line in FIG. 8. In this modified example, this part indicated by the two-dot dashed line is omitted. Specifically, an angle θ that the first end surface 24a of the first flat wire 20a forms with an extension line of an outer surface is smaller than 90°, so that a leading end of the first flat wire 20a has a pointed shape. In addition, the first end surface 24a and the outer surface are connected to each other by an arc-shaped curved surface. According to this configuration, the amount of the first and second flat wires 20a, 20b used can be reduced, and the stator 1 can be downsized.

On the other hand, in the case of this configuration, as shown in FIG. 8, the first side surface 23a has a substantially triangular shape and is narrower than the rectangular first side surface 23a shown in FIG. 4. Thus, burn-through tends to occur during welding at both ends of the first flat wire 20a in the width direction (the x-axis direction). However, in the laser welding method for flat wires according to this embodiment, the molten pool 30 is grown in a center part of the first flat wire 20a in the width direction (the x-axis direction) while the laser beam is applied smoothly in a loop shape. Thus, such burn-through at both ends can be suppressed.

Figure 9:
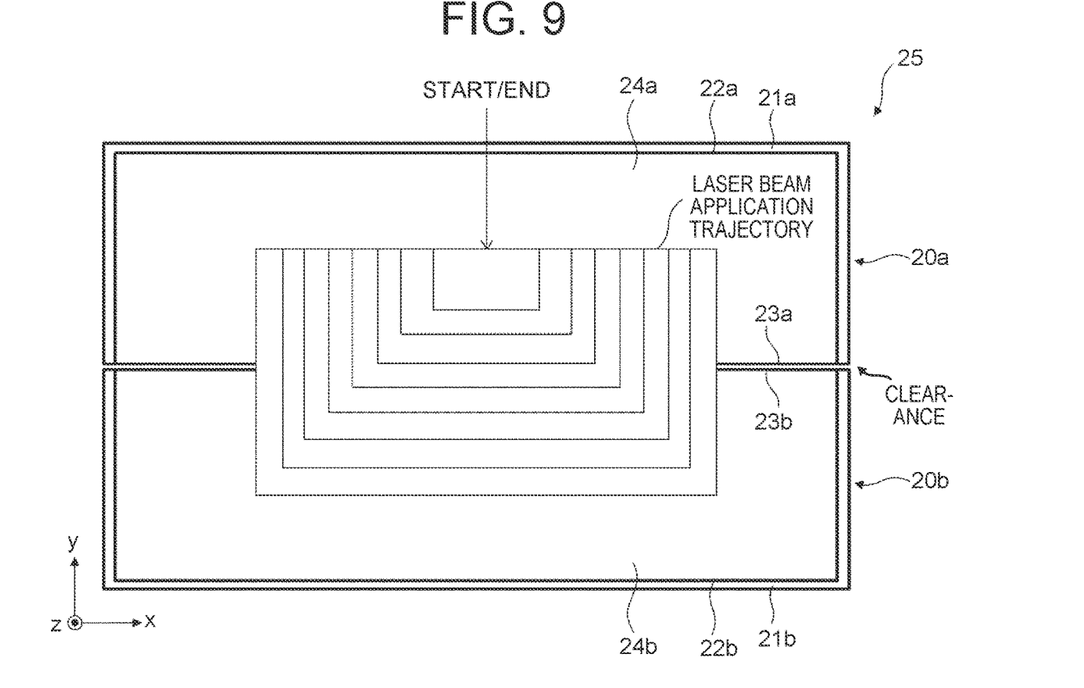
FIG. 9 is a plan view showing a modified example of a laser beam application trajectory in the laser welding method for flat wires according to the first embodiment.
Figure 10:
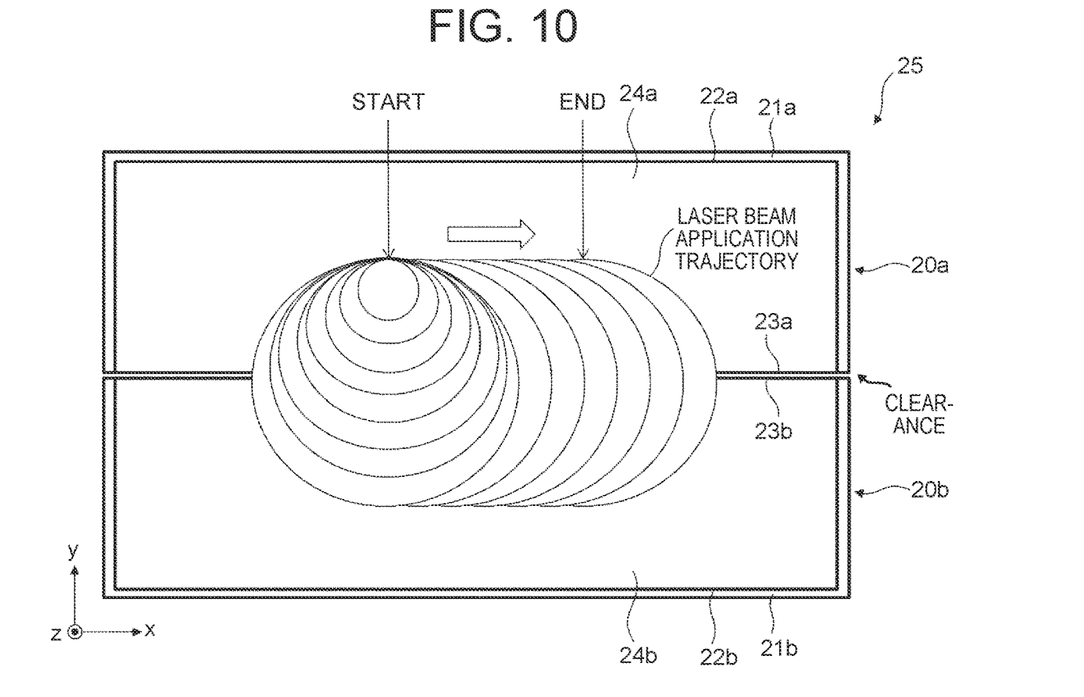
FIG. 10 is a plan view showing a modified example of the laser beam application trajectory in the laser welding method for flat wires according to the first embodiment.
Figure 11:
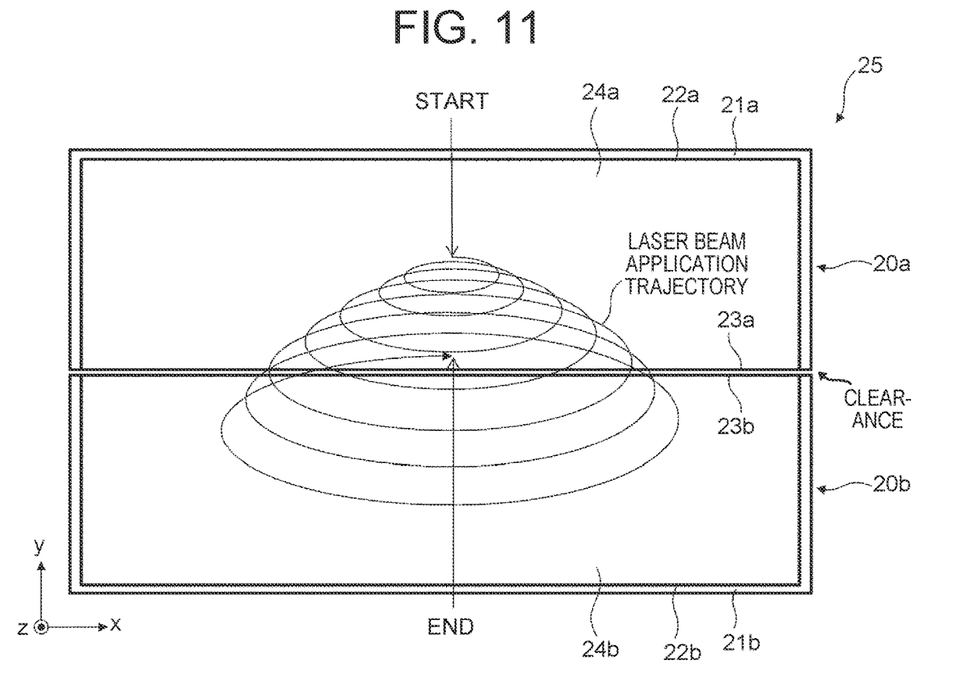
FIG. 11 is a plan view showing a modified example of the laser beam application trajectory in the laser welding method for flat wires according to the first embodiment.

Next, modified examples of the first embodiment will be described with reference to FIG. 9 to FIG. 11. FIG. 9 to FIG. 11 are plan views showing the modified examples of the laser beam application trajectory in the laser welding method for flat wires according to the first embodiment. The right-handed xyz-coordinates shown in FIG. 9 to FIG. 11 coincide with those in FIG. 2 to FIG. 5.

As shown in FIG. 9, the loop-shaped laser beam application trajectory may have a rectangular loop shape. In the case of a rectangular trajectory, however, the laser beam trajectory needs to take sharp turns at corners in contrast to a circular trajectory. Specifically, in the case of a rectangular trajectory, the laser beam cannot be applied smoothly at corners, so that heat tends to concentrate at the corners and spatter tends to occur compared with if the trajectory has an elliptical shape or a circular shape. In other words, in the case where the laser beam application trajectory has an elliptical shape or a circular shape, the laser beam can be applied constantly along a smooth trajectory. Thus, generation of spatter can be suppressed.

As shown in FIG. 10, the loop-shaped laser beam application trajectory may have a circular loop shape. As shown in FIG. 10, after a circular molten pool is grown across the first end surface 24a of the first flat wire 20a and the second end surface 24b of the second flat wire 20b, this molten pool may be moved in the width direction of the first and second flat wires 20a, 20b (a positive x-axis direction in the shown example). The loop-shaped laser beam application trajectory does not have to be a closed loop as shown in FIG. 10, and may instead be an open loop (spiral shape) as shown in FIG. 11.

With the loop-shaped laser beam application trajectories shown in FIG. 9 to FIG. 11, too, it is possible to form the molten pool 30 inside the end surface of one flat wire and grow the molten pool 30 so as to reach the clearance between the first side surface 23a and the second side surface 23b.

That is, it is possible to fill the clearance between the first side surface 23a and the second side surface 23b with the molten pool 30 before the laser beam passes over the first and second side surfaces 23a, 23b. Thus, the laser beam can be prevented from entering the clearance between the first side surface 23a and the second side surface 23b. As a result, adverse effects caused by the laser beam entering the clearance between the side surfaces can be reduced.

Second Embodiment

Figure 12:
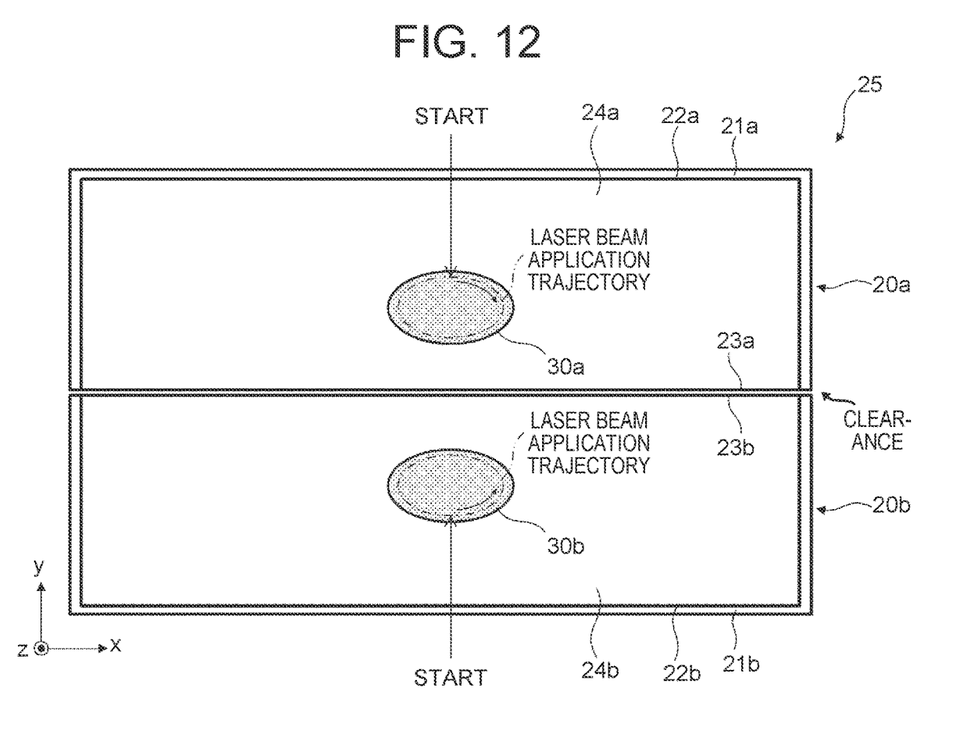
FIG. 12 is a plan view showing a laser welding method for flat wires according to a second embodiment.
Figure 13:
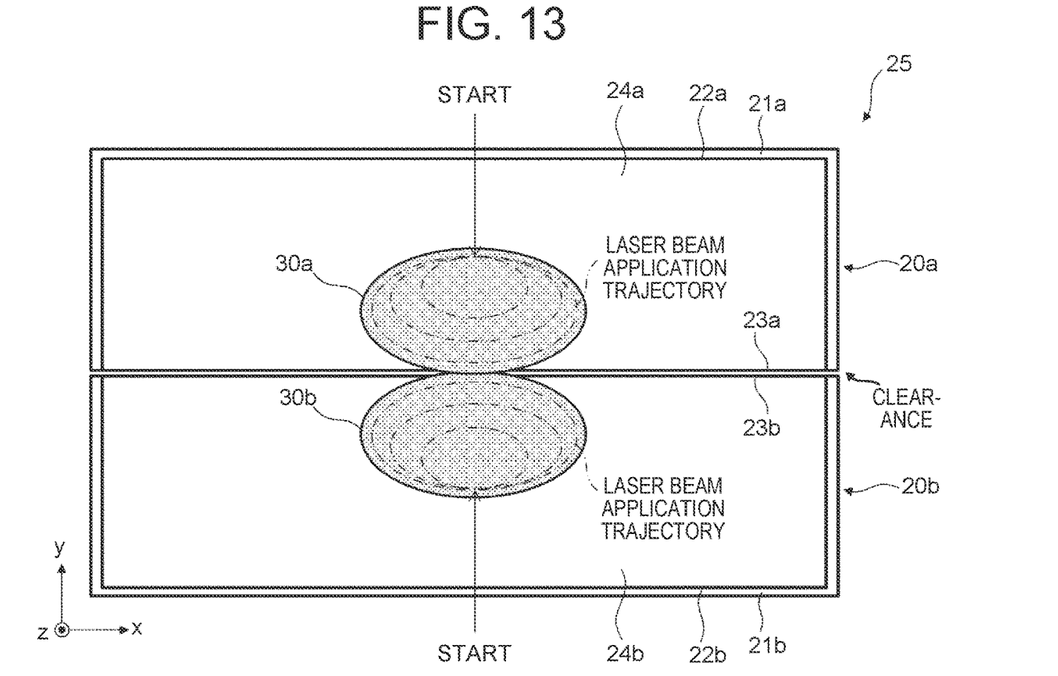
FIG. 13 is a plan view showing the laser welding method for flat wires according to the second embodiment.
Figure 14:
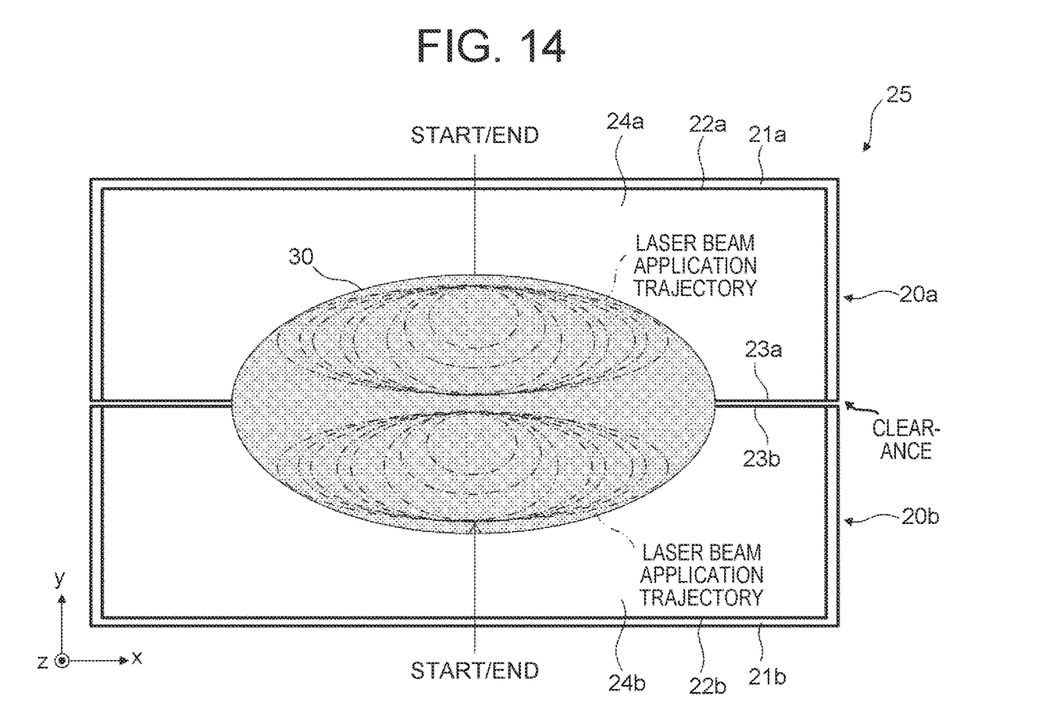
FIG. 14 is a plan view showing the laser welding method for flat wires according to the second embodiment.

Next, a laser welding method for flat wires according to this embodiment will be described with reference to FIG. 12 to FIG. 14. FIG. 12 to FIG. 14 are plan views showing the laser welding method for flat wires according to the second embodiment. The right-handed xyz-coordinates shown in FIG. 12 to FIG. 14 coincide with those in FIG. 2 to FIG. 5.

First, as shown in FIG. 12, the first side surface 23a of the first flat wire 20a that is stripped of the first insulating film 21a and the second side surface 23b of the second flat wire 20b that is stripped of the second insulating film 21b are butted together at the joint part 25. Then, a laser beam is applied in a loop shape inside the first end surface 24a of the first flat wire 20a to form a first molten pool 30a. At the same time, a laser beam is applied in a loop shape inside the second end surface 24b of the second flat wire 20b to form a second molten pool 30b. It is possible to apply a laser beam to the first and second end surfaces 24a, 24b at the same time by splitting the laser beam.

As shown in FIG. 12, in the laser welding method for flat wires according to this embodiment, first the laser beam is applied in a loop shape inside the first end surface 24a of the first flat wire 20a to form the first molten pool 30a. At the same time, another laser beam is applied in a loop shape inside the second end surface 24b of the second flat wire 20b to form the second molten pool 30b. Thus, the laser beam is not applied to the first and second side surfaces 23a, 23b. At this stage, therefore, the laser beam is prevented from entering the clearance between the first side surface 23a and the second side surface 23b.

Next, as shown in FIG. 13, the diameter of the laser beam application trajectory, i.e., the diameter of the ellipse, is increased inside the first end surface 24a of the first flat wire 20a to allow the first molten pool 30a to reach the first and second side surfaces 23a, 23b. At the same time, the diameter of the laser beam application trajectory, i.e., the diameter of the ellipse, is increased inside the second end surface 24b of the second flat wire 20b to fuse the second molten pool 30b with the first molten pool 30a. Specifically, each time the laser beams return to their respective application start positions (START indicated by the arrows in FIG. 13), the diameters of the ellipses being the application trajectories are increased. Thus, the diameters of the first and second molten pools 30a, 30b also increase, so that, at the stage where the laser beams are respectively applied inside the first end surface 24a of the first flat wire 20a and the second end surface 24b of the second flat wire 20b, the first molten pool 30a and the second molten pool 30b are fused together in the vicinity of the first and second side surfaces 23a, 23b.

As a result, the clearance between the first side surface 23a and the second side surface 23b is filled with the fused first and second molten pools 30a, 30b. That is, at this stage, the laser beam is not applied to the first and second side surfaces 23a, 23b, and the clearance between the first side surface 23a and the second side surface 23b is filled with the fused first and second molten pools 30a, 30b. Thus, the laser beam is prevented from entering the clearance between the first side surface 23a and the second side surface 23b.

Next, as shown in FIG. 14, the diameters of the laser beam application trajectories, i.e., the diameters of the ellipses, are increased inside the first end surface 24a of the first flat wire 20a and the second end surface 24b of the second flat wire 20b, until the fused molten pool 30 grows to a desired size. Specifically, each time the laser beams return to their respective application start positions (START indicated by the arrows in FIG. 14), the diameters of the ellipses being the application trajectories are increased. When the diameters of the ellipses reach a predetermined value, application of the laser beams is ended at their respective application start positions (END indicated by the arrows in FIG. 14).

In the laser welding method for flat wires according to the second embodiment, unlike the laser welding method for flat wires according to the first embodiment, the laser beams are not applied to the first and second side surfaces 23a, 23b even at the stage where application of the laser beams is ended. Moreover, the clearance between the first side surface 23a and the second side surface 23b is filled with the fused molten pool 30. Thus, the laser beams can be prevented from entering the clearance between the first side surface 23a and the second side surface 23b.

As has been described above, in the laser welding method for flat wires according to this embodiment, first the laser beams are applied in a loop shape respectively inside the first end surface 24a of the first flat wire 20a and the second end surface 24b of the second flat wire 20b to form the first and second molten pools 30a, 30b. Thereafter, the diameters of the laser beam application trajectories, i.e., the diameters of the ellipses, are increased inside the first end surface 24a of the first flat wire 20a and the second end surface 24b of the second flat wire 20b to fuse together the first molten pool 30a and the second molten pool 30b.

Thus, in the laser welding method for flat wires according to this embodiment, no laser beam is applied to the first and second side surfaces 23a, 23b throughout the course of welding. Moreover, the clearance between the first side surface 23a and the second side surface 23b is filled with the molten pool 30 (the molten pool into which the first and second molten pools 30a, 30b are fused). Compared with the laser welding method for flat wires according to the first embodiment, it is possible to further prevent the laser beam from entering the clearance between the first side surface 23a and the second side surface 23b by fusing together the first and second molten pools 30a, 30b. As a result, adverse effects caused by the laser beam entering the clearance between the side surfaces can be further reduced.

Thus, in the laser welding method for flat wires according to this embodiment, the first and second molten pools 30a, 30b are formed inside the end surfaces of both flat wires and the first molten pool 30a and the second molten pool 30b are grown so as to fuse together. Then, the clearance between the first side surface 23a and the second side surface 23b is filled with the molten pool 30 (the molten pool into which the first and second molten pools 30a, 30b are fused). It was confirmed that this method could prevent a laser beam from entering a clearance of up to 0.30 mm. A clearance of this value is twice as large as that in the laser welding method for flat wires according to the first embodiment, which means that the second embodiment is more effective in preventing a laser beam from entering the clearance between the side surfaces.

Figure 15:
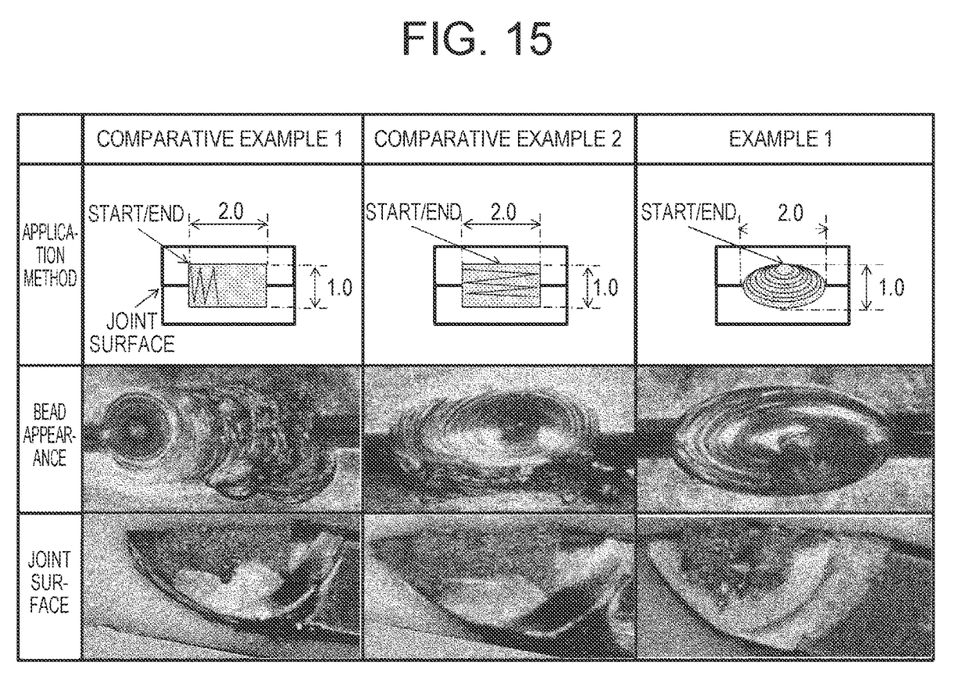
FIG. 15 is a table showing test conditions and results of Example 1 and Comparative Examples 1 and 2.

An example and comparative examples of the present disclosure will be described below. However, the present disclosure is not limited to the following example. FIG. 15 is a table showing test conditions and results of Example 1 and Comparative Examples 1 and 2. In each of Example 1 and Comparative Examples 1 and 2, flat wires (with a thickness of 2.147 mm and a width of the end surface of 4.0 mm) having the end shape as shown in FIG. 8 were laser-welded. A single-mode fiber laser beam with laser power of 2.0 kW and a beam diameter of 60 μm was used. The rate of travel of the laser beam along the application trajectory was 750 mm/sec. With only the application method varied among Example 1 and Comparative Examples 1 and 2, these examples were compared in terms of appearance of the bead, generation of spatter, appearance of the joint surfaces, and laser beam leakage through the clearance between the joint surfaces (damage to the insulating films).

The upper row of FIG. 15 shows the application methods of Example 1 and Comparative Examples 1 and 2. In Comparative Example 1, the laser beam application trajectory followed a path with hairpin turns in a direction substantially perpendicular to the joint surfaces (side surfaces) in a center part of the pair of butted flat wires. The application region of Comparative Example 1 indicated by hatching in FIG. 15 was 2.0 mm wide in the width direction of the flat wires and 1.0 mm thick in the thickness direction of the flat wires. The laser beam was applied from an upper left end to a right end of the application region shown in FIG. 15 and then returned to the upper left end to end the application (START/END in FIG. 15).

In Comparative Example 2, the laser beam application trajectory followed a path with hairpin turns in a direction substantially parallel to the joint surfaces (side surfaces) in a center part of the pair of butted flat wires. As in Comparative Example 1, the application region of Comparative Example 2 indicated by hatching in FIG. 15 was 2.0 mm wide in the width direction of the flat wires and 1.0 mm thick in the thickness direction of the flat wires. The laser beam was applied from a center point at an upper end to a lower end of the application region shown in FIG. 15 and then returned to the center point at the upper end to end the application (START/END in FIG. 15).

The laser beam application trajectory in Example 1 was the elliptical trajectory of the first embodiment that has been described in detail using FIG. 2 to FIG. 5. As shown in FIG. 15, in the application region indicated by hatching in FIG. 15, the major diameter of the largest elliptical trajectory was 2.0 mm in the width direction of the flat wires and the minor diameter of the largest elliptical trajectory was 1.0 mm in the thickness direction of the flat wires. The laser beam was applied from a center point at an upper end of the application region shown in FIG. 15, and each time the laser beam returned to the center point at the upper end, the diameter of the ellipse was gradually increased. After the largest elliptical trajectory was drawn, the application was ended at the center point at the upper end (START/END in FIG. 15).

The middle row of FIG. 15 shows photographs of the appearances of the beads in Example 1 and Comparative Examples 1 and 2. In Comparative Example 1, a disturbance in the bead and spatter occurred. In Comparative Example 2, a large amount of spatter was recognized. It is considered that a disturbance in the bead and spatter tend to occur in Comparative Examples 1 and 2 because the molten pool is disturbed at turnaround points of the trajectories. In Example 1, no disturbance in the bead was observed, and the amount of spatter was significantly smaller than in Comparative Examples 1 and 2. It is considered that a disturbance in the bead and spatter are less likely to occur in Example 1 because the elliptical trajectory has no turnaround points and therefore the laser beam can be applied constantly smoothly. The depth of the bead was 2.0 mm.

The bottom row of FIG. 15 shows photographs of the appearances of the joint surfaces (butted surfaces) in Example 1 and Comparative Examples 1 and 2. In Comparative Examples 1 and 2, burn-through was recognized at both ends of the triangular joint surfaces. A possible cause is heat concentration at the turnaround points. In Example 1, no burn-through was recognized. In Example 1, the molten pool is grown in the center part of the flat wires in the width direction while the laser beam is applied smoothly in an elliptical shape. This seems to be why burn-through at both ends can be prevented.

In Comparative Examples 1 and 2, laser beam leakage was recognized even when the clearance between the joint surfaces was 0.1 mm. In Example 1, by contrast, no laser beam leakage was recognized for clearances of up to 0.15 mm between the joint surfaces. In Comparative Examples 1 and 2, it is not possible to grow the molten pool and fill the clearance between the joint surfaces with this molten pool before the laser beam passes over the joint surfaces. In Example 1, by contrast, it is possible to fill the clearance between the joint surfaces with the molten pool before the laser beam passes over the joint surfaces. This seems to be why the laser beam can be prevented from entering the clearance between the joint surfaces.

The present disclosure is not limited to the above embodiments but can be appropriately changed within the scope of the gist of the disclosure.

What is claimed is:

1. A laser welding method for flat wires in which a first side surface at a first end of a first flat wire coated with a first insulating film, the first side surface being stripped of the first insulating film, and a second side surface at a second end of a second flat wire coated with a second insulating film, the second side surface being stripped of the second insulating film, are butted together, and a laser beam is applied to a first end surface of the first flat wire and a second end surface of the second flat wire to weld together the first side surface and the second side surface, the laser welding method comprising:

applying the laser beam in a loop shape inside the first end surface to form a molten pool; and applying the laser beam inside the first end surface while gradually increasing a diameter of a loop-shaped trajectory of the laser beam to allow the molten pool to reach the first side surface and the second side surface.

2. The laser welding method according to claim 1, wherein the loop shape is a circular shape or an elliptical shape.

3. The laser welding method according to claim 1, wherein the loop shape is a rectangular shape.

4. The laser welding method according to claim 1, wherein the loop shape is a spiral shape.

5. The laser welding method according to claim 1, wherein the loop shape is an elliptical shape, and a major axis of the ellipse is parallel to the first side surface and the second side surface.

6. The laser welding method according to claim 1, wherein, in the first end surface, the laser beam is applied to only a region of the first end surface that is located on a side of the first side surface relative to an application start position of the laser beam.

7. The laser welding method according to claim 1, wherein the laser beam is applied to the second end surface as the diameter of the loop-shaped trajectory of the laser beam increases gradually.

8. The laser welding method according to claim 1, further comprising:

applying another laser beam in a loop shape inside the second end surface to form another molten pool; and applying the other laser beam inside the second end surface while gradually increasing a diameter of a loop-shaped trajectory of the other laser beam to fuse together the molten pool and the other molten pool.

9. The laser welding method according to claim 8, wherein in the first end surface, the laser beam is applied to only a region of the first end surface that is located on a side of the first side surface relative to an application start position of the laser beam, and in the second end surface, the other laser beam is applied to only a region of the second end surface that is located on a side of the second side surface relative to an application start position of the other laser beam.

10. The laser welding method according to claim 8, wherein the laser beam is applied to the second end surface as the diameter of the loop-shaped trajectory of the laser beam increases gradually, and the other laser beam is applied to the first end surface as the diameter of the loop-shaped trajectory of the other laser beam increases gradually.

11. The laser welding method according to claim 8, wherein the laser beam is applied to only the first end surface, and the other laser beam is applied to only the second end surface.

* * * * *